(12) United States Patent
Schoch et al.

(10) Patent No.: US 11,940,863 B2
(45) Date of Patent: *Mar. 26, 2024

(54) LOW-POWER WAKEUP PATTERN DETECTION OF MULTIPLE DATA STREAMS

(71) Applicant: TEXAS INSTRUMENTS INCORPORATED, Dallas, TX (US)

(72) Inventors: Andreas Michael Schoch, Moosburg ab der Isar (DE); Ernst Muellner, Munich (DE)

(73) Assignee: Texas Instruments Incorporated, P.O. Box, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,201

(22) Filed: Nov. 16, 2021

(65) Prior Publication Data

US 2022/0075442 A1 Mar. 10, 2022

Related U.S. Application Data

(63) Continuation of application No. 16/727,116, filed on Dec. 26, 2019, now Pat. No. 11,204,638.

(51) Int. Cl.
G06F 1/32 (2019.01)
G06F 1/12 (2006.01)
G06F 1/3287 (2019.01)

(52) U.S. Cl.
CPC ............ *G06F 1/3287* (2013.01); *G06F 1/12* (2013.01)

(58) Field of Classification Search
CPC .................................. G06F 1/32; G06F 9/32
See application file for complete search history.

(56) References Cited

U.S. PATENT DOCUMENTS 6,678,728 B1 * 1/2004 Uppunda ............... H04L 12/12
710/10
8,258,957 B2 9/2012 Mickle et al.
(Continued)

FOREIGN PATENT DOCUMENTS

CN 101281664 A 10/2008

OTHER PUBLICATIONS

Notification of Transmittal of the International Search Report and the Written Opinion of the International Searching Authority, or the Declaration; PCT/US 2020/066327; dated Mar. 11, 2021, 8 pages.

*Primary Examiner* — Keshab R Pandey
(74) *Attorney, Agent, or Firm* — Brian D. Graham; Frank D. Cimino

(57) ABSTRACT

Described herein is a technology for a wakeup pattern-data stream correlation by a detector to provide a trigger condition for a microcontroller in a wakeup receiver (WuRX). For example, the detector includes a data packet layer with a plurality of index registers that are updated through sampling of data streams. A sample clock is coupled to each of the plurality of index registers to independently activate each of the plurality of index registers. A shared comparator will then compare the updated plurality of index registers to corresponding shift registers that are initialized with rotating wakeup pattern bits. Based upon a number of matching results, the detector generates a triggering signal that facilitates a low-power operating mode to a high-power operating mode change.

16 Claims, 5 Drawing Sheets

(56) References Cited

U.S. PATENT DOCUMENTS

| | | |
|---|---|---|
| 2006/0022801 A1 | 2/2006 | Husak et al. |
| 2012/0025903 A1* | 2/2012 | Foote .................. H03M 1/1245 |
| | | 341/122 |
| 2012/0257655 A1 | 10/2012 | Muth |
| 2012/0271975 A1 | 10/2012 | Elend |
| 2012/0327942 A1* | 12/2012 | Terabe .............. H04L 12/40039 |
| | | 370/400 |
| 2013/0111074 A1 | 5/2013 | Blaschke |
| 2014/0062668 A1 | 3/2014 | Gudan et al. |
| 2019/0090189 A1 | 3/2019 | Story |

* cited by examiner

LOW-POWER WAKEUP PATTERN DETECTION OF MULTIPLE DATA STREAMS

CROSS REFERENCE TO RELATED APPLICATIONS

This application is a continuation of U.S. patent application Ser. No. 16/727,116, filed Dec. 26, 2019, which application is incorporated herein by reference in its entirety.

BACKGROUND

Radio-Frequency Identification (RFID) uses radio waves to read and capture information stored on a tag attached to an object. A tag can be read from up to several feet away and does not need to be within direct line-of-sight of the reader to be tracked.

RFID is used in numerous applications, such as identification for passive or wireless keyless entry systems. In such applications, there are limited power or energy resources for identification for wireless keyless entry systems. As such, it is a common practice that RFID transponders monitor received radio frequency signals and determine whether or not they contain a specific wakeup pattern. For this purpose, the RFID transponders include a wakeup pattern mechanism which continuously monitor incoming signals from multiple sources.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

SUMMARY

Described herein is a power and area optimized technology for a wakeup pattern-data stream correlation by a detector to provide a trigger condition for a microcontroller in a wakeup receiver (WuRX). The trigger condition, for example, generates a low-power operating mode to a high-power operating mode change in the microcontroller to which the detector is associated with.

DETAILED DESCRIPTION

In an embodiment, the detector includes a plurality of "N" data packet layers where each data packet layer includes a plurality of "M" index registers ("M" and "N" are integer numbers), where "M" is the number of wakeup pattern bits, and "N" is the number of data streams that is a product of number of antennas multiplied by a number of demodulators from a transceiver. For example, 3 antennas * 12 demodulators. "N" translates to a number of data layers as further discussed below. Each data packet layer is coupled to "M" comparators, where the "M" comparators can be shared by a plurality of "N" data packet layers.

To update an index register, clock gating on each index register is used to independently activate the index register for sampling of data streams. The updated index register will be compared to a corresponding shift register by a corresponding comparator. Based upon the matching results from the plurality of "M" comparators, a trigger condition can be generated.

Figure 1:
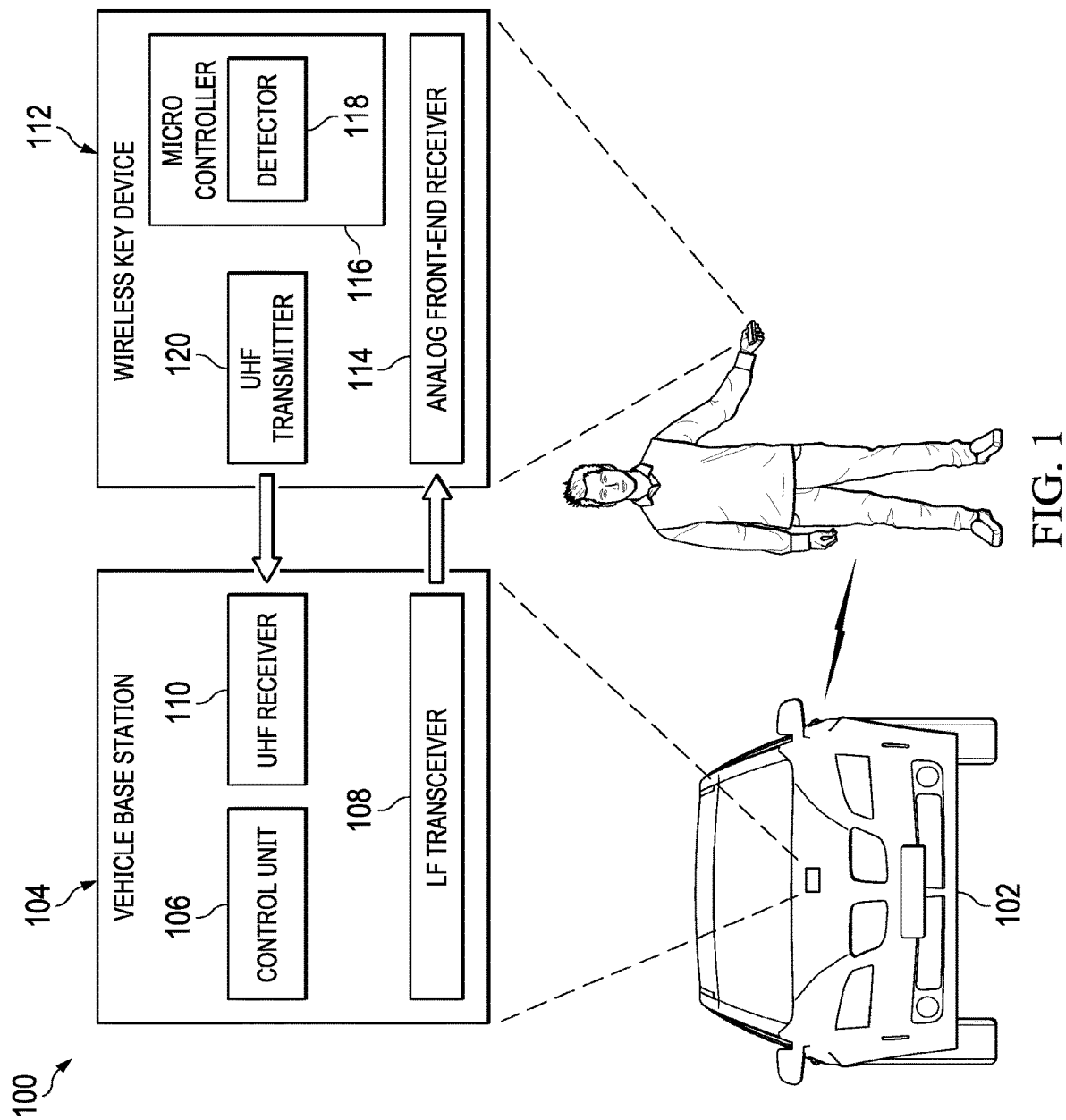
FIG. 1 is an example scenario that implements a device that transitions from a low-power mode to a high-power operating mode based on detected data streams as described herein.

FIG. 1 is an example scenario 100 that implements a device that transitions from a low-power mode to a high-power operating mode based on detected data streams as described herein. As shown, a vehicle 102 is associated to a vehicle base station 104 that includes a control unit 106, a low frequency (LF) transceiver unit 108, and an ultra-high frequency (UHF) receiver unit 110. A device, i.e. a wireless key device 112, includes an analog front-end receiver 114, a microcontroller 116 with a detector 118, and a UHF transmitter 120. For example, the wireless key device 112 is a dedicated device used to open doors and/or to start the engine of the vehicle 102.

As an example, the control unit 106 is configured to control keyless entry and engine ignition procedure of the vehicle 102 where the vehicle base station 104 is attached. The control unit 106 can have different access for the entry and engine ignition. In this regard, different wakeup patterns as described herein can be utilized to correspond for different access conditions.

In an embodiment, the control unit 106 transmits low frequency or LF interrogation signals. The LF interrogation signals include data streams to the wireless key device 112 through the LF transceiver 108. In certain implementations, data streams are words that are made a bit pattern (e.g., 32-bit), which represents the number of index registers, designated as "M" as further discussed below. The analog front-end receiver 114 can include 3 antennas and 12 demodulators, which represents the number of data layers as represented by "N" as further discussed below. This translates to 1152 (i.e., 32 bits * 3 antennas * 12 demodulators) toggling bits in the data layers. For oversampling, as further discussed below, the number of toggling bits is increased. For example, if oversampling is four times, the number of toggling bits are 4608 (4 times oversampling * 1152 bits). The wireless key device 112, and particularly the detector 118, receives the demodulated data streams through the analog front-end receiver 114. The detector 118 compares the received demodulated data streams to wakeup pattern bits, and based from this comparison, the detector 118 transmits a triggering signal to the microcontroller 116. During this period, the wireless key device 112 is receiving the data streams of the LF interrogation signals at a first operating mode, which uses a relatively minimal amount of power as described herein.

For example, the microcontroller 116 is operating at the first operating mode and will remain at this mode until the triggering signal is received from the detector 118. In this example, the triggering signal is used to change microcontroller's operating mode from the first operating mode to a second operating mode, which includes higher power consumption as compared to the first operating mode.

In an embodiment, the detector 118 receives and processes the demodulated data streams by comparing the sampled data streams to predefined wakeup pattern bits. Based upon this comparison, the detector 118 generates the triggering signal that is received by the microcontroller 116. The microcontroller 116 will then transition into the second operating mode.

At the second operating mode, the microcontroller 116 transmits control signals to the vehicle base station 104 through the UHF transmitter 120 (i.e., 315 MHz for North American automobiles, 433.92 MHz for European and Asian automobiles). For example, these control signals are received and used by the control unit 106 to perform actions on the vehicle 102, such as open vehicle doors, start the engine, etc.

The wireless key device 112 can be a dedicated wireless key configured for the vehicle 102 and particularly, the associated vehicle base station 104. In various operating scenarios, the wireless key device 112 receives multiple data streams such as other LF interrogating signals from a nearby vehicle, a wireless fidelity (Wi-Fi) signal, other surrounding noise, etc. In such instances, the wireless key device 112, and particularly the detector 118 demodulates the multiple data streams at a low power and performs wakeup pattern and data stream correlations in order to determine the particular data stream that matches the preconfigured wakeup pattern bits associated to the vehicle base station 104.

In response to the received data streams that match the predefined wakeup pattern bits, the wireless key device 112 is triggered to operate at the second operating mode.

Figure 2:
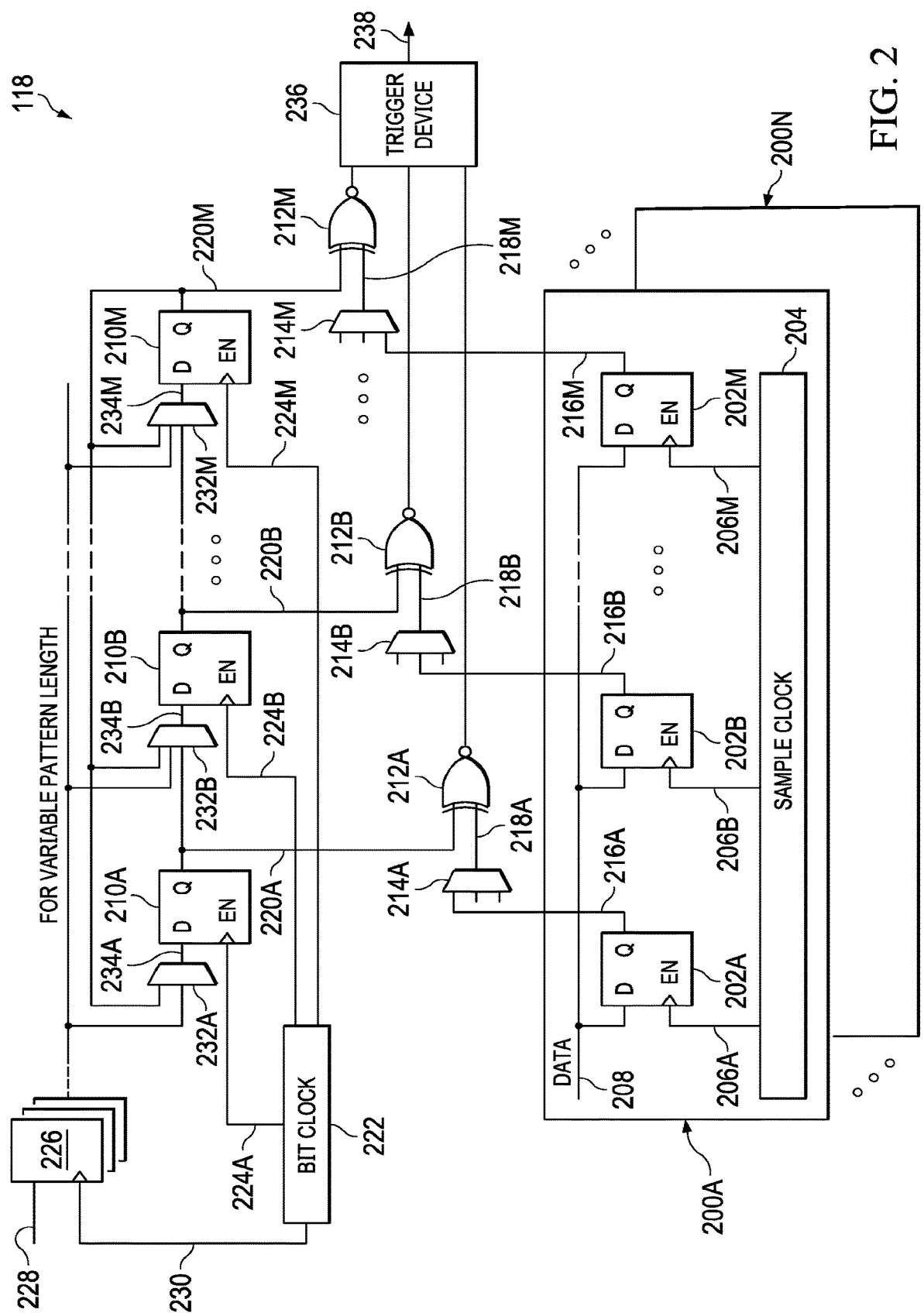
FIG. 2 illustrates an example implementation of a detector that performs correlations between wakeup pattern bits and multiple data streams as described herein.

FIG. 2 illustrates an example implementation of the detector 118 that performs correlations between wakeup pattern bits and multiple data streams as described herein. In the described operation of FIG. 2, no oversampling takes place.

As shown, the detector 118 includes a plurality of data packet layers 200A to 200N. Each of these "N" data packet layers 200 includes a plurality of index registers 202A to 202M, where "M" and "N" are integer numbers. As discussed, "M" is the number of bits in the bit pattern of the data stream. For example, the bit pattern can be 32 bits., and "M" is 32. As discussed, "N" is the number of antennas times the number of demodulators at the analog front-end receiver 114. "N" represents the number of data layers. There are "M*N" number of depicted index registers 202A to 202M, and "M*N" toggling bits. Therefore, if there are three antennas and 12 demodulators at the analog front-end receiver 114, the value of "N" will be 36 (i.e., 3*12), and there will be 36 data layers. Therefore, there will be "M*N" toggling bits and index registers 202. In this example, 32*36 or 1152 toggling bits and index registers 202.

As depicted, for certain implementations a sample clock 204 is connected to each of the "M*N" number of index registers 202 using individual clock inputs 206. The sample clock 204 operates at a particular bit clock frequency and provides separate and successive clock inputs 206 at the particular bit clock frequency. In other words, sample clock 204 provides a clock input 206A to index register 202A, followed by another clock input 206B to index register 202B, successively to providing a clock input 206M to register 202M for each data layer 200 (i.e., 200A to 200N). The index registers 202 receive data, where register inputs of the index registers 202 are connected to data 208 for each data layer 200 (i.e., 200A to 200N).

Furthermore, the detector 118 includes a plurality of wakeup pattern shift registers 210A to 210M. The number of wakeup pattern shift registers 210 is equal to the number of index registers 202 of a data packet layer 200. In other words, if there are "M" index registers 202 of a data packet layer 200, there are also "M" wakeup pattern shift registers 210. There can be a variable pattern length of wakeup bits to support particular data stream words. In other words, if a data stream word includes 16 bits instead of 32 bits, the wakeup pattern supports 16 bits and "M" will be 16.

The wakeup pattern shift registers 210A to 210M are coupled to comparators 212A to 212M, respectively. The outputs of each comparator 212 are respectively received by multiplexors 214. In other words, multiplexor 214A receives output 216A, multiplexor 214B receives output 216B, up to multiplexor 214M receives output 216M. The multiplexors 214A to 214M receive the respective outputs 216A to 216M from each of the data layers 200A to 200N, multiplexing the outputs 216A to 216M and providing respective outputs 218A, 218B up to 218M. Comparators 212 are used to compare data stream bits of index registers 202 with wakeup pattern bits 220A to 220M of shift registers 210. In specific, comparators 212 compare outputs 218A up to 218M with 220A to 220M of shift registers 210. Each of these "M" wakeup pattern shift registers 210A to 210M are coupled to a bit clock 222 which provides bit clock signals 224A to 224M, respectively.

The "M" wakeup pattern shift registers 210A to 210M are initialized to store rotating wakeup pattern bits 220A to 220M. After initialization, the wakeup pattern bits 220A to 220M rotate through the shift registers 210A to 210M for each bit clock 224A to 224M from the bit clock 222. Initial wakeup pattern bits 226 are provided as data 228 from a memory or storage (not shown) which may be part of or external to detector 118. A enable bit signal 230 can be provided by bit clock 222. Multiplexors 232A to 232M support rotation or initialization of the wakeup pattern bits 220A to 220M. Output signals 234A to 234M are respectively provided to the inputs of registers 210A to 210M.

Rotation, or shifting of wakeup pattern bits 220A to 220M, is performed to support a proper comparison of bits in a data stream to the wakeup pattern. In other words, if the wakeup pattern bits 220A to 220M does not follow the data stream bits, proper comparison cannot be performed. Data streams 208 are continuously received per bit clock frequency determined by the sample clock 204. Since the data streams 208 are continuously received, the wakeup pattern bit pattern is rotated or shifted. For example, the first bit value is shifted to the second bit value, the second bit value is shifted to the through bit value, up to the last bit value shifted to the first bit value. In certain implementations, a variable pattern length of a wakeup pattern is supported. In other words, different bit lengths of a wakeup pattern can be supported.

For example, the "M" wakeup pattern bits 220A to 220M are stored at the "M" wakeup pattern shift registers 210A to 210M. In this example, the "M" wakeup pattern bits 220A to 220M are rotated after each bit clock signal 224A to 224M from the bit clock 222. This rotation updates the content of each shift register 210A to 210M after each bit clock signals 224A to 224M, with the same frequency. For the depicted operation, the contents of the "M*N" index registers 202 are updated at the same time as well, since clock frequencies phase shift of the sample clock 204 and the bit clock 222 are the same for the operation.

Each of the "M*N" index registers 202 can be independently controlled or activated to sample the data streams 208 using the clock gates 206. The sampling of the digital streams 208 by the "M*N" index registers 202 is synchronous with the bit clock from the bit clock 222. That is, the contents of the "M*N" index registers 202 are updated when the "M" wakeup pattern bits 220A to 220M are rotated or shifted at the "M" wakeup pattern shift registers 210. That is, since the data 208 is streamed at the same frequency as bit clock 222, comparison of wakeup pattern bits 218 against data stream bits of data stream 208 is properly performed by assuring that the corresponding wakeup pattern bits 220A to 220M are rotated or shifted. In an embodiment, the contents of the "M*N" index registers 202 are updated by the clock gate 206. In this regard, power savings during data storage can be obtained since not all "M*N" index registers 202 are toggled during each bit clock on the bit clock 222.

In an embodiment, the "M" comparators 212 are configured to compare the "M" wakeup pattern bits 220A to 220M to corresponding content of the "M" index registers 202. After a full cycle of wakeup pattern rotation, index registers 202 are updated one by one and a new cycle starts. Due to wake pattern compare operations at every bit clock 222, while the wakeup pattern is rotating, combinations of the wakeup pattern are used for data correlation. Therefore, the index registers are considered as static, while the wakeup pattern is dynamic. For example, at bit clock 222, the comparator 212A compares the value of the shift register 210A to the value of the index register 202A of the data packet layer 200A; the comparator 212B compares the value of the shift register 210B to the value of the index register 202B of the same data packet layer 200A; and so on. These comparisons made on the data packet layer 200A are independent of the comparisons to be made on each of the other data packet layers 200B-200N. In other words, the "M" comparators 212 are placed "N" times to operate the "N" data packet layers independently. The "M" comparators 212 are placed "N" times for every data packet layer and compared at bit clock 222.

After the above comparisons by the "M" comparators 212, the detector 118 utilizes a trigger device 236 to determine number of matches between the "M" rotating wakeup pattern bits and the sampled data streams 208 from the "M*N" index registers 202. In other words, the matches are the number of bits in the sampled data streams 208 that match with the wakeup pattern bits 220A to 220M. The comparators 212 which perform the matching, either output a "1" as to a match or a "0" if no matched. The aggregate value of the comparators provide a "threshold" value to triggering device 236. Based on the number of matches, the trigger device 236 transmits a triggering signal 238 to the microprocessor 116. The triggering signal 238, for example, facilitates transition from the first low power operating mode to the second-high power operating mode as described herein.

Figure 3:
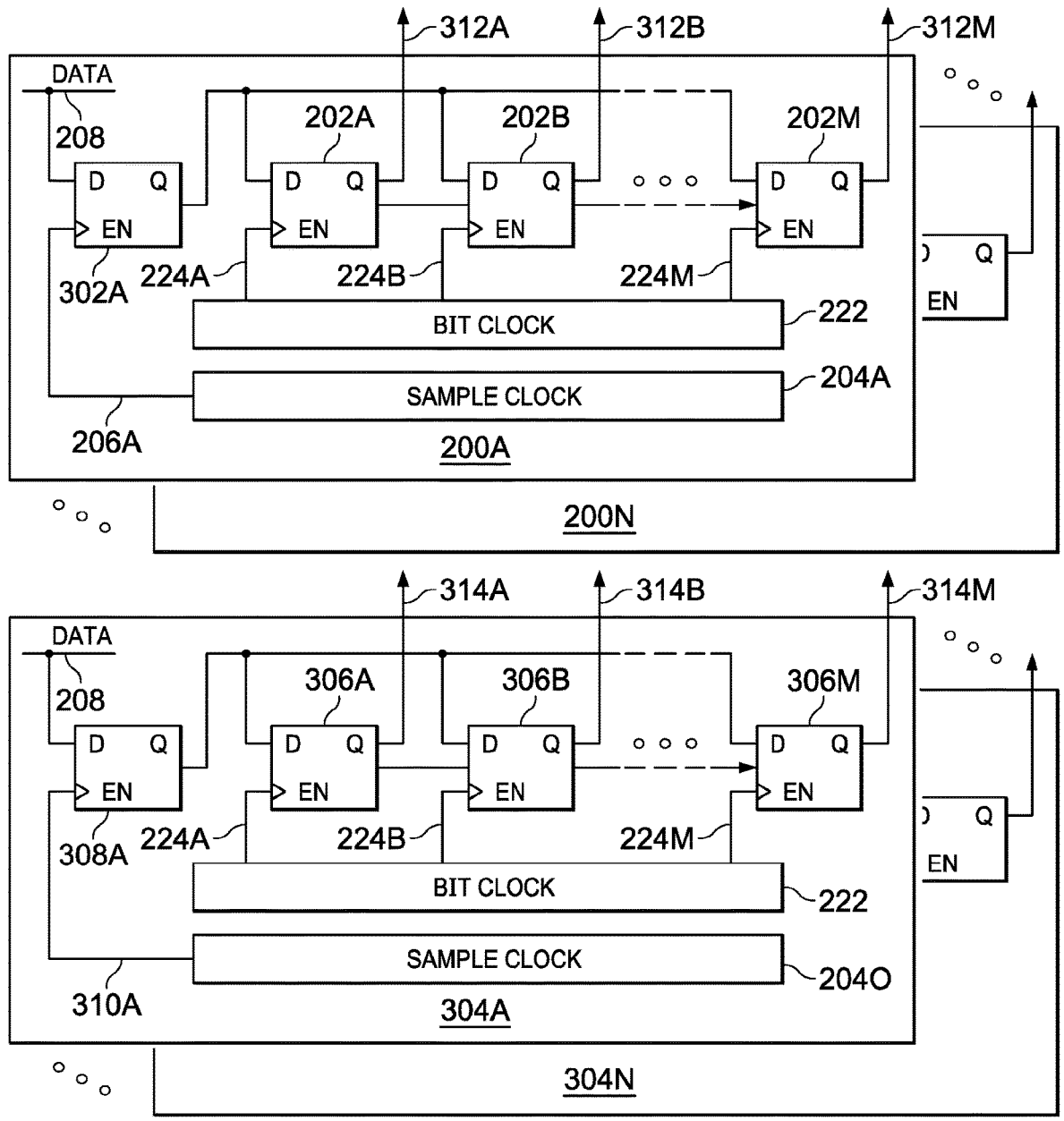
FIG. 3 illustrates an example detector that implements a multi-oversampling operation as described herein.

FIG. 3 illustrates an example detector 118 that implements a multi-oversampling operation as described herein. Particularly, the depicted detector 118, for example, is implementing a double or two times oversampling operation to illustrate the multi-oversampling operation. In other words, for two times oversampling, there is a phase shift of $2\pi/2$, or $\pi$. In other implementations, additional oversampling can be performed, such as four times oversampling, where the phase shift is $2\pi/4$, or $\pi/2$. For two times oversampling, two sample clocks are implemented, which operate at different times or phases. In other words, for two times or double oversampling, sampling is performed at one time or phase, and another sampling is performed at another time or phase (e.g., $\pi$ for two times oversampling, $\pi/2$ for four times oversampling). As will be further discussed, comparison is performed as to the number of correct matches for received data stream bits with the wakeup pattern bits.

The oversampling operation as described herein includes a sample clock frequency that is a multiple of the bit clock frequency, i.e. frequency of the bit clock 222 For example, on the depicted double oversampling (i.e., two times oversampling) operation, the sample clocks 204A and 204O (i.e., two sample clocks) are used. That is sample clock 204A, is used for data layers 200, and sample clock 204O is used for data layers 304. Sample clock 204A operates at a different time/phase than sample clock 204O. In this simplified example, double oversampling is described, and two sample clocks 204A and 204O are implemented. Therefore, in a four times oversampling implementation, four sample clocks operating at different times/phases are used. "O" denotes number of oversampling and is an integer number.

In certain embodiments, an index register 302 is added on each of the data packet layers 200A-200N. The index register 302 is used to initiate receipt of the data stream bits 208, and is enabled by sample clock 204 (i.e., receives enable signal 206). That is, index register 302A is added to the data packet layer 200A, an index register 302B (not shown) is added to the data packet layer 200B, and up to 302N (not shown) is added to data packet layer 200N. Therefore, there are "(M+1) * N" total number of index registers for the "N" data packet layers 200. Each of the index registers 302 is connected to a sample clock 204A while the "M" index registers 202 for each data packet layer 200 is connected to the bit clock 222.

FIG. 3 further illustrates another independent set of data packet layers 304A to 304N for the two times or double oversampling operation as described herein. Each of these "N" data packet layers 304 includes a plurality of index registers 306A-306M. Index register 308A to 308N (not shown) are respectively added to data packet layers 304A to 304N. That is, there are "(M+1) *N" number of depicted index registers for the independent set of "N" data packet layers 304. Each of the index registers 308 is connected to the sample clock 204O through clock gates 310, while each of the plurality of index registers 306A-306M are connected to the bit clock 224 through clock gates 310.

The index registers 302 and 308 are used with sample clocks 204 for oversampling implementations. Index registers 202 and 306 operate with bit clock 222. This is the case since comparisons are performed between the wakeup pattern and index registers 202 and 306 within a bit clock 222 cycle. A direct update with sample clock 204 would corrupt the comparison.

For oversampling, index registers 302 and 308 are implemented to receive data 208. In contrast, for no oversampling the data 208 can be received directly by the index registers (e.g., index registers 202 and 306). In an implementation, at the first sample clock 204A, the index registers 302 samples data 208 and are updated accordingly. At the same time, the sampled data from registers 302 is uploaded at index registers 202, the sampled data from registers 308 are uploaded to index registers 306. This takes place "O*N" times with bit clock 222 at one of the "M" index registers, where "O"=2.

For each data layer 200A to 200N, an output 312 (i.e., outputs 312A to 312M) of index registers 202A to 202M are received at respective multiplexors 214 (not shown) of "M" number of structures as described further below in FIG. 4. For each data layer 304A to 304N, an output 314 (i.e., outputs 314A to 314M) of index registers 306A to 306M are received at respective multiplexors 214 (not shown) of "M" number of structures as described further below in FIG. 4.

After the comparisons between contents of the shift registers 210 and the index registers 202 by comparators 212A-M, the trigger device 236 determines the number of matches and compares these number of matches to the first threshold.

At the sample clock 204O, which is a different phase than the sample clock 204A, the "N" index registers 308 sample data from the data streams 208 and get updated accordingly. The sampled data gets updated at the second sample clock 204O and can be uploaded to the index registers 306 at bit clock 222 as described above.

After the comparisons between contents of the shift registers 210 and the index registers 306, the trigger device 236 determines the number of matches and compares these number of matches to the first threshold. In an embodiment, a second threshold is utilized to generate the triggering signal when the second threshold exceeds a set number of times that the first threshold is met.

After the sample clock 204O (not shown), a change in bit clock 222 will require the same operations described above. However, at this changed bit clock 222, the values of the index registers 302 and the index registers 308 will be carried over on the next sample clocks 204A and 204O for the subsequent bit clock. In other words, the values at index registers 302 and index registers 308 are down sampled to the respective subsequent index register 202 (i.e., 202A) and index register 306 (i.e., 306A). This is performed to avoid corrupting the wakeup pattern comparison.

Figure 4:
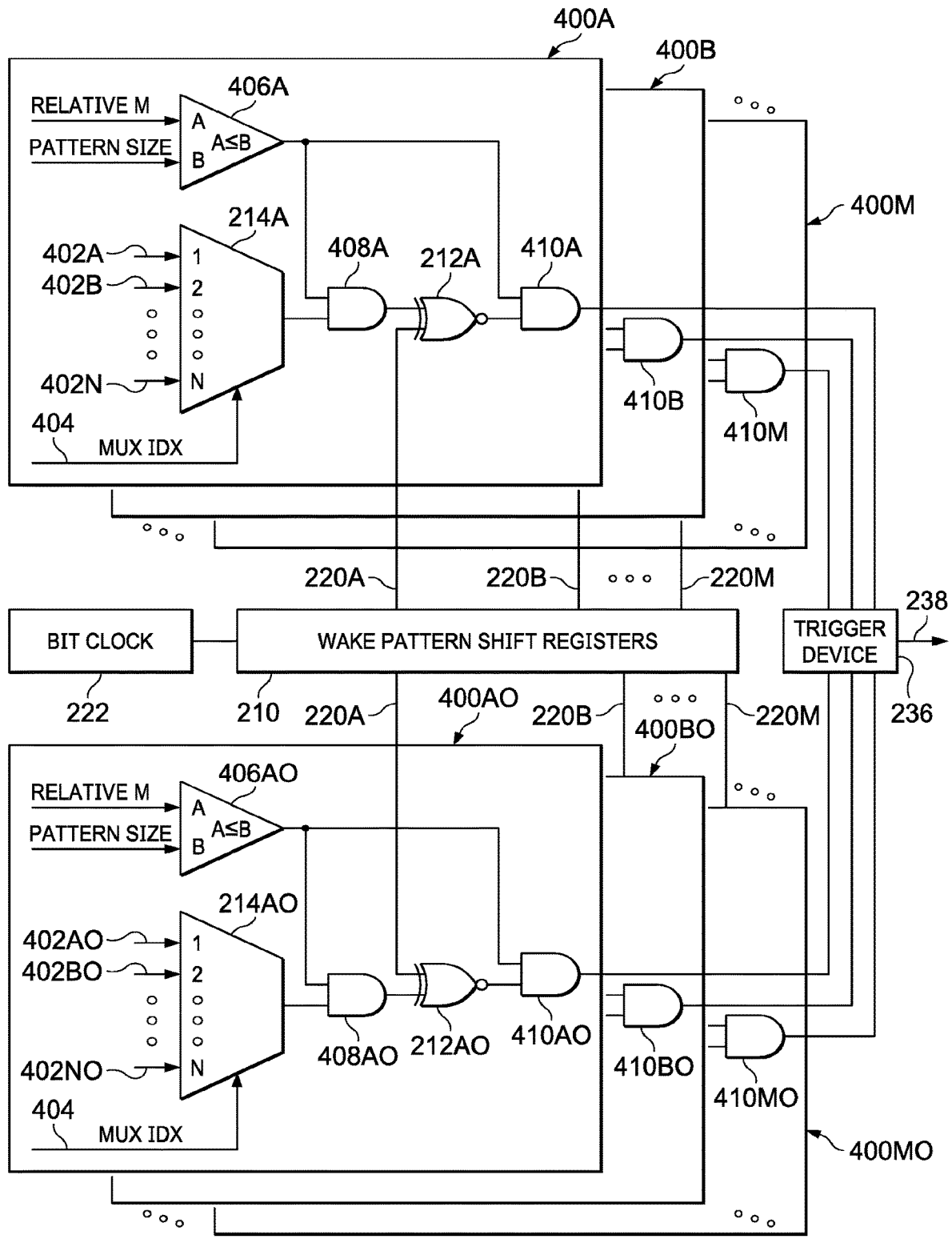
FIG. 4 illustrates an example detector that facilitates an area optimization in case of multi-oversampling operations as described herein.

FIG. 4 illustrates an example expansion of detector 118. FIG. 4 shows structures 400 which expand the structures described above in reference to FIG. 3 which described double oversample or two times oversampling. In other words, structures 400 can be included as part of detector 118. In particular, 400A to 400M ("M" total number) structures to support the first sampling, and 400AO to 400MO ("M" total number) structures that support the second oversampling).

As discussed above in FIG. 3, for each data layer 200A to 200N, an output 312 (i.e., outputs 312A to 312M) of index registers 202A to 202M are received at respective multiplexors 214 of respective structures 400A to 400M, and for each data layer 304A to 304N, an output 314 (i.e., outputs 314A to 314M) of index registers 306A to 306M are received at respective multiplexors 214 of respective structures 400A to 400M.

For each index register 202A to 202M of the data layers 200A to 200N, the respective outputs 312A to 312M of index registers 202 are received by respective multiplexors 214A to 214M. For example, multiplexor 214A receives an input 402A which is the output of index register 202A of data layer 200A, an input 402B which is the output of index register 202A of data layer 200B, up to input 402N which in is the output of index register 202A of data layer 200N. For each index register 306A to 306M of the data layers 304A to 304N, the respective outputs 314A to 314M of index registers 306 are received by respective multiplexors 214AO to 214MO (not shown). For example, multiplexor 214AO receives an input 402AO which is the output of index register 306A of data layer 304A, an input 402BO which is the output of index register 306A of data layer 304B, up to input 402NO which in is the output of index register 202A of data layer 304N.

Detector 400 provides "M" comparisons of index registers with the wakeup pattern, where components of layers are placed "M" times each. In certain implementations, in order to optimize area, the detector 400 is included in the detector 118 described above. Otherwise, comparators are not shared through the multiplexors as described below, and comparators are implemented multiple times.

As discussed, "M" is also the number of bits in a wakeup pattern word. In the implementation described in FIG. 4, a comparison is performed in comparing of data streams to wakeup pattern, where a first threshold is number of bits that match (i.e., bits of received data stream to the wakeup pattern word) and the second threshold is number of sampling comparisons that meet criteria of the first threshold for certain data layers. The first threshold is available for single and oversampling implementations, while the use of a second threshold is only used for oversampling implementations.

In certain implementation, "M" comparators are shared through a multiplexor 214. The multiplexor 214 performs comparison with "N" stages at a MUX IDX (multiplexor index) 404 clock bit rate that is faster than the bit clock 222, because a comparator 212 performs comparison within a bit clock cycle of bit clock 222 at "N" stages (or greater). Therefore, "clock frequency MUX IDX/bit clock 222 frequency" is greater than one.

The detector 400 performs functionalities similar to the detector 118 described above; however, the detector 400 can implement fewer number of components. Particularly, the detector 400 uses at least "M" number of multiplexers 214 that may operate up to "N" stages of the multi-oversampling operation, depending on the frequency the multiplexor selector MUX IDX 404 clock is operating. In other words, the multiplexers 214 operate at "N" stages, placed once for every wakeup pattern comparison, and "M" times for a wakeup pattern cycle.

For example, in the double-oversampling operations of FIG. 3, each of the multiplexers 214 includes "N" number of inputs 402, where 402 inputs are values from indexed registers, that in certain implementations are indexed registers 202A to 202M or 306A to 306M. For example, at MUX IDX 404 clock, the input 402A corresponds to the output of index register 202A of each of the "N" data packet layers 200, the input 402A corresponds to the output of index register 202B of each of the "N" data packet layers 200, and so on. This operation is repeated at MUX IDX 404 clock, e.g., input 402AO corresponds to index register 306A of each of the "N" data packet layers 304, the input 402BO corresponds to the index register 306B of each of the "N" data packet layers 304, and so on. Accordingly, "M*O" number of multiplexers can be shared to operate up to "N" stages of the detector 400 or detector 118 of FIG. 3.

The output of multiplexors 214A and 214AO select the indexed data register (i.e., registers 202A to 202M, registers 306A to 306M), that is compared with a wakeup pattern bit of dynamic wakeup pattern 220A, where the multiplexor 214A selects between 202A of 200A up to 202A of 200N respectively, and 214AO selects between 306A of 304A up to 306A of 304N, for M times. Therefore, the output multiplexor 214M accordingly selects between the indexed data register 202M of 200A up to 200N respectively, and 214MO selects between 306M of 304A up to 306M of 304N that is compared with a wakeup pattern bit of dynamic wakeup pattern 220M The output (binary "1" or "0") of comparator 406 controls the output AND gate 408 (e.g., 408A) and AND gate 410 (e.g., 410A). Data packet layers are placed independently "M" times to process correlation of the maximum number of pattern bits "M", since "M" can be reduced (e.g., 12, 16, 32 bits), and the relevant bits are masked. Masking occurs when output of comparator 406 is zero or "0", resulting in AND gate 408 and 410 with zero or "0" value.

In an embodiment, comparator 406 masks the correlation of the index registers 202 and 306 with the wakeup pattern, if the index M of the corresponding indexed register exceeds the maximum logical configured wakeup pattern registers. For example, if an implementation uses 32 bits for a wakeup pattern, but configurable to a 12, 16, or 24 bit wakeup pattern, rotation/shifting feedback of wakeup pattern is adapted for the different wakeup pattern bit configuration.

Furthermore, in a case where a number of data packet layers 200 and 304 are higher than a relation between switching the multiplexer 402 and the sample clock 206, the data packet layers 200 and 304 can be spread over several multiplexers in order to gain area optimization. In this case, the grade of area optimization is defined by the frequency of the multiplexer in comparison to the sample clock 206.

Figure 5:
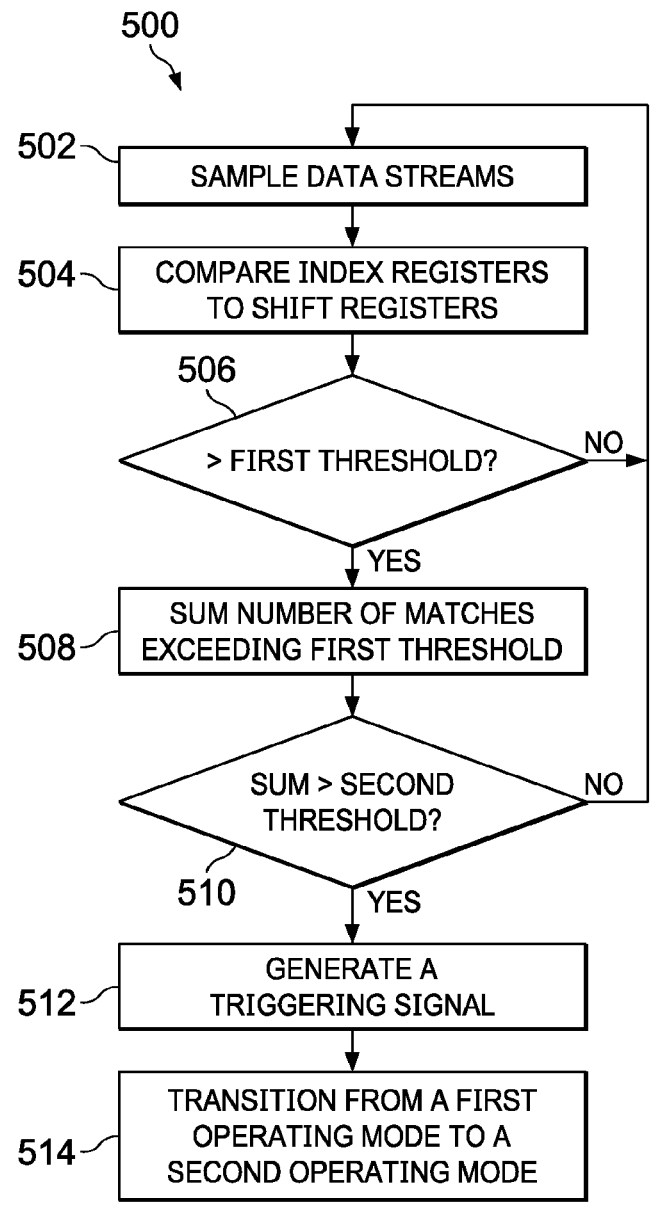
FIG. 5 is an example process chart illustrating an example method for detecting data streams that facilitates transitioning of power in a microcontroller as described herein.

FIG. 5 shows an example process chart 500 illustrating an example method for detecting data streams that facilitate transitioning of power in a microcontroller as described herein. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, sample data streams to update state of index registers is performed. For example, at sample clock 206A, the data streams 208 are sampled through temporary index registers 302. In this example, the index registers 202 are updated through the index registers 302.

At block 504, comparison the index registers to shift registers is performed. For example, the "M * 0" comparators 212 compare the state of the shift registers 210 to the corresponding index registers 202 or 304 with the clock that provides MUX IDX 404, that needs to be faster than bit clock 222.

In an embodiment, the "M" comparators 212 are shared by the data packet layers 200A to 200N and 304A to 304N independently. In this embodiment, at least "M * 0" number of comparators 212 are used to serve N data packet layers 200 and 304 which operates with the same clock (e.g., 32 kHz) that provides MUX IDX 404 that is faster than bit clock 222. MUX IDX 404 may be 32 KHz where bit clock 222 is 2 KHz, which translates to MUX IDX 404 being 16 times faster than bit clock 222. The MUX IDX 404 can operate between 16 data layers.

At block 506, compare number of matches to a first threshold value is performed. For example, the number of matches from output of the shared "M" number of comparators 212 are compared to the first threshold value.

In response to the number of matches that satisfies the first threshold value, then following the "YES" branch of block 506, at block 508, an adder for summing up the number of times that the first threshold value were satisfied can be used. Otherwise, following the "NO" branch of block 506, at block 502, the data streams are sampled over the next bit clock period and the comparison is repeated.

At block 510, compare number of times that the first threshold value is satisfied with a second threshold value is performed. For example, the summation is compared to the second threshold value. In response to the summation that satisfies the second threshold value, following the "YES" branch of block 510, then at block 512, a triggering signal (e.g., triggering signal 238) is generated. Otherwise, following the "NO" branch of block 510, at block 502, the data streams are sampled again over the next bit clock period.

At block 514, transitioning from a first operating mode to a second operating mode is performed. For example, when the adder satisfies the second threshold value, then the microcontroller 116 is configured to change from the first operating mode to the second operating mode.

What is claimed is:

1. A device comprising:
   a data index register, wherein the data index register is configured to be activated through sampling of a data stream;
   a wakeup pattern shift register that is configured to store wakeup pattern bits;
   a comparator that is configured to compare an updated data index register to a wakeup pattern bit from the wakeup pattern shift register to produce an output;
   a trigger device coupled to the comparator, wherein the trigger device is configured to generate a triggering signal based on the output of the comparator; and
   a microcontroller coupled to the trigger device, the microcontroller configured to transition to a high-power mode in response to the received triggering signal.

2. The device of claim 1, further comprising a sample clock configured to provide a clock gate to the data index register.

3. The device of claim 1 further comprising a bit clock that is coupled to the wakeup pattern shift register, wherein the bit clock synchronizes a rotation of the wakeup pattern bits with the sampling of the data stream.

4. The device of claim 3 wherein the bit clock facilitates a bit rotation of the rotating wakeup pattern bits at the end of the sampling of the data stream.

5. The device of claim 1 further comprising a multiplexer to select the updated data index register for the comparator.

6. The device of claim 5, wherein a state of the updated data index register is received and compared by the comparator to the wakeup pattern shift register.

7. The device of claim 1, wherein the trigger device utilizes a first threshold value and a second threshold value in determining number matches to output the triggering signal to the microcontroller.

8. The device of claim 1, wherein the microcontroller transitions from a first low-power operating mode to a second operating mode that includes the high-power mode.

9. A method comprising:
   activating, a data index register, by sampling a data stream;
   storing, by a wakeup pattern shift register, wakeup pattern bits;
   comparing, by a comparator, an updated data index register to a wakeup pattern bit from the wakeup pattern shift register to produce an output;
   generating, by a trigger device coupled to the comparator, a triggering signal based on the output of the comparator; and
   transitioning, by a microcontroller coupled to the trigger device, a high-power mode in response to the received triggering signal.

10. The method of claim 9, further comprising providing a clock gate by a sample clock to the data index register.

11. The method of claim 9 further synchronizing, by a bit clock, a rotation of the wakeup pattern bits with the sampling of the data stream.

12. The method of claim 11 wherein the bit clock facilitates a bit rotation of the rotating wakeup pattern bits at the end of sampling of the data stream.

13. The method of claim 9 further comprising selecting, by a multiplexer, the updated data index register for the comparator.

14. The method of claim 13, further comprising:
  receiving, by the comparator, a state of the updated data index register; and
  comparing, by the comparator, the state of the updated data index register to the wakeup pattern shift register.

15. The method of claim 9, wherein the trigger device utilizes a first threshold value and a second threshold value in determining number matches to output the triggering signal to the microcontroller.

16. The method of claim 9, wherein the microcontroller transitions from a first low-power operating mode to a second operating mode that includes the high-power mode.

* * * * *